US009925459B2

(12) United States Patent
Mikhailov

(10) Patent No.: US 9,925,459 B2
(45) Date of Patent: Mar. 27, 2018

(54) DETECTING AND PREVENTING FALSE POSITIVES

(71) Applicant: Sony Interactive Entertainment Inc., Tokyo (JP)

(72) Inventor: Anton Mikhailov, Campbell, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 795 days.

(21) Appl. No.: 14/198,422

(22) Filed: Mar. 5, 2014

(65) Prior Publication Data

US 2014/0274396 A1    Sep. 18, 2014

Related U.S. Application Data

(60) Provisional application No. 61/788,197, filed on Mar. 15, 2013.

(51) Int. Cl.
| | | |
|---|---|---|
| *A63F 9/24* | (2006.01) |
| *A63F 13/422* | (2014.01) |
| *A63F 13/211* | (2014.01) |
| *A63F 13/20* | (2014.01) |
| *A63F 13/42* | (2014.01) |

(52) U.S. Cl.
CPC ............ *A63F 13/422* (2014.09); *A63F 13/20* (2014.09); *A63F 13/211* (2014.09); *A63F 13/42* (2014.09)

(58) Field of Classification Search
CPC ......... A63F 13/20; A63F 13/211; A63F 13/42
USPC ...................................... 463/36, 47
See application file for complete search history.

(56) References Cited

U.S. PATENT DOCUMENTS

| 2005/0226431 A1* | 10/2005 | Mao ............... G10L 21/0208 381/61 |
| 2007/0168047 A1* | 7/2007 | Cromer ............... G11B 21/12 700/1 |
| 2008/0300055 A1 | 12/2008 | Lutnick et al. |

(Continued)

FOREIGN PATENT DOCUMENTS

WO    WO 2014/149777    9/2014

OTHER PUBLICATIONS

PCT Application No. PCT/US2014/020871, International Search Report and Written Opinion dated Jul. 30, 2014.

(Continued)

*Primary Examiner* — Jay Liddle
*Assistant Examiner* — Ryan Hsu
(74) *Attorney, Agent, or Firm* — Polsinelli LLP

(57) ABSTRACT

Detection and prevention of false positives associated with a handheld controller are provided. Information is stored in memory regarding indicia of false positive input associated with a handheld controller used to control media usage. Sensor information is monitored at the handheld controller. It may be detected that the monitored sensor information matches one or more indicia of false positive input. Subsequent input received from the handheld controller may then be nullified, such that the nullified input is not registered and does not result in control changes to the associated media. It may then be detected that the monitored sensor information no longer matches one or more indicia of false positive input. Subsequently, nullification is ended, and subsequent input received from the handheld game controller is registered normally and results in control changes to the associated media.

24 Claims, 2 Drawing Sheets

(56) References Cited

U.S. PATENT DOCUMENTS

2012/0154294 A1  6/2012 Hinckley et al.
2012/0178529 A1* 7/2012 Collard ................ A63F 13/428
                                                463/31
2014/0002338 A1* 1/2014 Raffa .................... G06F 1/1694
                                                345/156

OTHER PUBLICATIONS

PCT/US14/20871, Detecting and Preventing False Positives, Mar. 5, 2014.

* cited by examiner

DETECTING AND PREVENTING FALSE POSITIVES

CROSS-REFERENCE TO RELATED APPLICATIONS

The present application claims the priority benefit of U.S. provisional application 61/788,197 filed Mar. 15, 2013, the disclosure of which is incorporated herein by reference.

BACKGROUND OF THE INVENTION

1. Field of the Invention

The present invention generally relates to handheld controllers. More specifically, the present invention relates to detecting and preventing false positives in handheld controllers.

2. Description of the Related Art

Presently available handheld controllers include a variety of buttons, triggers, analog sticks, and other input components known in the art. An exemplary handheld controller is illustrated in FIGS. 1A and 1B. The illustrated handheld controller is the Sony PS3® Dualshock® controller that may be used with home entertainment devices or consoles, such as the Sony PlayStation®3 or Playstation®4. As can be seen from the illustrations, the handheld controller has a variety of input options that can be used by a player to provide direction to the associated console. For certain games, for example, the triggers may be used to activate weapons, while other buttons or analog sticks may be used to move game characters around the game environment.

Such handheld controllers may also be used to control actions with respect to a variety of media playable on the associated console. Such media may include movies, television shows, games, music, and other types of content known in the art. There are a variety of controls available in presently available entertainment consoles that allow for different control actions or changes to the media being consumed or played by the user. Each button, trigger, and other input option may be mapped to certain control actions with respect to the media being played. For example, the trigger buttons R2 and L2 illustrated in FIG. 1B may be mapped to actions for rewinding and fast-forwarding through a movie or other type of video.

Because a handheld controller is designed to be held, some complications may arise when users put down the handheld controller or otherwise handle them in uncontrolled ways. For example, a user may drop the handheld controller or toss the handheld controller onto an uneven surface. Such user actions may press or otherwise activate buttons, triggers, etc. on the handheld controller, thereby resulting in unintended control actions to occur with respect to the media being played. Referring to the example provided above, if the button L2 is activated in such a manner, the movie being played may being rewinding, which may be an inconvenience and annoyance to the user.

There is therefore a need for improved systems and methods for detecting and preventing false positives in handheld controllers.

SUMMARY OF THE INVENTION

Embodiments of the present invention include systems and methods for detecting and preventing false positives in handheld controllers. Information is stored in memory regarding indicia of false positive input associated with a handheld controller used to control media usage. Sensor information at the handheld controller is monitored. It may be detected that the monitored sensor information matches one or more indicia of false positive input. Subsequent input received from the handheld controller may then be nullified, such that the nullified input is not registered and does not result in control changes to the associated media. It may then be detected that the monitored sensor information no longer matches one or more indicia of false positive input. Subsequently, nullification is ended, and subsequent input received from the handheld game controller is registered normally and results in control changes to the associated media.

Various embodiments of the present invention include methods for detecting and preventing false positives in handheld controllers. Such methods may include storing information in memory regarding indicia of false positive input associated with a handheld controller used to control media usage, monitoring sensor information at the handheld controller, detecting that the monitored sensor information matches one or more indicia of false positive input, nullifying subsequent input received from the handheld controller so that the nullified input is not registered and does not result in control changes to the associated media, detecting that the monitored sensor information no longer matches one or more indicia of false positive input, and ending nullification so that subsequent input received from the handheld game controller is registered and results in control changes to the associated media.

Embodiments of the present invention may further include systems for detecting and preventing false positives in handheld controllers. Such systems may include a game system comprising memory for storing information regarding indicia of false positive input associated with a handheld controller used to control media usage and a handheld controller comprising a plurality of input components that monitor a plurality of input, a plurality of sensors that monitors sensor information, and a communication interface for communicating the monitored input. The game system may further include a processor for executing instructions to detect that the monitored sensor information matches one or more indicia of false positive input, nullify subsequent input received from the handheld controller so that the nullified input is not registered and does not result in control changes to the associated media, detect that the monitored sensor information no longer matches one or more indicia of false positive input, and ends nullification so that subsequent input received from the handheld game controller is registered and results in control changes to the associated media. The sensors may include accelerometers and gyroscopes.

Other embodiments of the present invention include non-transitory computer-readable storage media on which is embodied instructions executable to detect and prevent false positives in handheld controllers in general accordance with the method previously set forth above.

DETAILED DESCRIPTION

Embodiments of the present invention allow for detecting and preventing false positives in handheld controllers. Information is stored in memory regarding indicia of false positive input associated with a handheld controller used to control media usage. Sensor information at the handheld controller is monitored. It may be detected that the monitored sensor information matches one or more indicia of false positive input. Subsequent input received from the handheld controller may then be nullified, such that the nullified input is not registered and does not result in control changes to the associated media. It may then be detected that the monitored sensor information no longer matches one or more indicia of false positive input. Subsequently, nullification is ended, and subsequent input received from the handheld game controller is registered normally and results in control changes to the associated media.

Figure 1A:
FIG. 1A is a front view of an exemplary handheld controller known in the art.
Figure 1B:
FIG. 1B is perspective view of the exemplary handheld controller of FIG. 1A.

FIG. 1A is a front view of an exemplary handheld controller known in the art. FIG. 1B is perspective view of the exemplary handheld controller of FIG. 1A. Such a handheld controller may include a variety of input components, which may include buttons, triggers, analog sticks, touchpads, and other input components known in the art. A handheld controller may further include a variety of sensors for detecting motion and position, such as accelerometers, gyroscopes, cameras, and other sensors known in the art.

Handheld controllers may include handheld computing, gaming, or media controller devices (e.g., Sony PlayStation® Portable (PSP®), Sony Vita®). Alternatively, handheld controllers (e.g., Sony PS3® Dualshock®, Sony P54® Dualshock®) may be peripheral to an associated electronic media device, which may include computing devices, game consoles, entertainment consoles, set-top boxes, Blu-Ray® players, electronic gaming systems, or a home entertainment device (e.g., Sony PlayStation®3 or Playstation®4), or any other type of media device capable of being used with a handheld controller.

As noted above, some handheld controllers are themselves also portable media devices rather than being peripheral to a media device. Such media devices—portable and not portable—may be configured to access data from other storage media, such as memory cards or disk drives as may be appropriate in the case of downloaded content. Media devices may also include standard computing components such as network and media interfaces, non-transitory computer-readable storage (memory), and processors for executing instructions that may be stored in memory.

As described above, false positive input includes input detected by input components in the handheld controller that are actually unintended by the user. There may be various indicia that are indicative that input may be false positive. For example, when a user tosses a handheld controller, the handheld controller generally goes through three stages. First, the handheld controller may be accelerated into the air. At the peak of its arc, the handheld controller may experience freefall. Finally, upon landing, the handheld controller experiences a sharp deceleration. Changes in state, such as those associated with freefall, may be detected by sensors, including accelerometers and gyroscopes.

Such indicia that are associated with the false positives may be stored in memory and compared against input information being received at the handheld controller. If there is a match detected between received sensor information at the handheld controller and one or more indicia of false positives (e.g., freefall), subsequent input at the handheld controller may be nullified so that such nullified input does not result in any control changes or actions. An indicia associated with freefall may include, for example, a time value indicative that a distance of the freefall is longer than an average human arm. It may then be determined based on further sensor information at the handheld controller that the indicia of false positives are no longer present (e.g., the handheld controller has come to rest). Once the indicia of false positives are no longer present, the nullification may be ended, whereby subsequent input at the handheld controller are registered normally and result in the appropriate control changes or actions.

Figure 2:
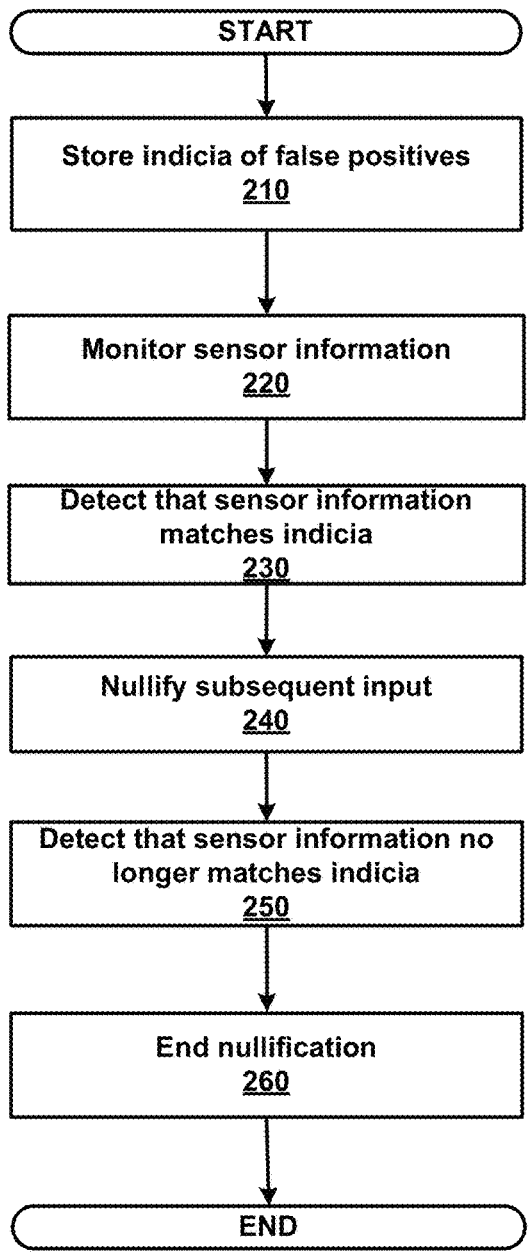
FIG. 2 is a flowchart illustrating a method for detecting and preventing false positives in handheld controllers.

FIG. 2 is a flowchart illustrating a method 200 for detecting and preventing false positives in handheld controllers. The method 200 of FIG. 2 may be embodied as executable instructions embodied in a computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 as illustrated in FIG. 2, information is stored in memory regarding indicia of false positive input associated with a handheld controller used to control media usage. A plurality of input at a handheld controller, which includes sensor information, is monitored. It may be detected that the monitored input matches one or more indicia of false positive input. Subsequent input received from the handheld controller may then be nullified, such that the nullified input is not registered and does not result in control changes to the associated media. It may then be detected that the monitored input no longer matches one or more indicia of false positive input. Subsequently, nullification is ended, and subsequent input received from the handheld game controller is registered normally and results in control changes to the associated media.

In step 210, indicia regarding false positives may be stored in memory. Such indicia may be the result of any kind of action that results in input components being activated unintentionally. Typical actions include throwing, dropping, and other types of accidental or uncontrolled movements related to the handheld controller. Such indicia of false positives may be detected and evaluated by various sensors in the handheld controller, such as accelerometers and gyroscopes. Such indicia of false positives may therefore include sets of sensor readings and values that occur in situations where the handheld controller inputs may be unintentionally activated.

The stored indicia of false positives may be different for different media applications and devices. For example, some games may allow for handheld controllers to register certain gestures. Such gestures may vary by game and as such, the indicia for false positives may be adjusted accordingly so that intended gestures may continue to be registered rather than nullified. Moreover, the stored indicia may be updated to reflect changes and updates related to the sensors, handheld controller, media device, and media. In some embodiments, the indicia may also be customized to the user. Users may also be allowed choose among which types of false positives they wish to monitor and nullify and which they do not.

In step 220, sensor information from the handheld controller may be monitored, and in step 230, monitored sensor information is detected as matching one or more indicia of false positives. Sensor information may include information provided by any sensor known in the art, including accelerometer and gyroscope data. As sensor information is received, it may be compared to the stored indicia of false positives to determine whether or not there is a match. For example, certain sets of accelerometer values (and/or gyroscope values) may indicate that the handheld controller is likely subject to certain actions or movements (e.g., freefall) likely to result in false positive readings from the input components.

In step 240, incoming input from the handheld controller is nullified. Normally (in the absence of nullification), input information from the handheld controller is registered and results in control changes or actions with respect to media play. As a result of nullification, however, the input received subsequent to the nullification is not registered and therefore results in no control changes or actions. Such input are presumed to be the result of the actions or movements likely to result in unintended control changes or actions (e.g., false positives). As such, they are not allowed to take effect with respect to any associated media.

In step 250, sensor information now indicates that the indicia of false positives are no longer present. Whereas in step 230, the sensor information indicated a state (e.g., freefall) likely to produce false positives, the sensor information received in step 250 indicates that such a state no longer exists (e.g., the handheld controller has come to rest). Different sensor readings or values may reflect, for example, that the present state no longer matches those indicia of false positives stored in memory.

In step 260, the nullification of input components is removed or otherwise ended. As such, the input components are reactivated and returned to normal operation. Any input received after the nullification has ended will be registered as normal and therefore result in the associated control action or change.

The present invention may be implemented in an application that may be operable or associated with a variety of end user devices that may be used with a handheld controller. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for detecting and preventing false positives in a handheld gaming controller, the method comprising:
   storing information regarding indicia of false positive input associated with the handheld gaming controller used to control media usage, wherein the indicia of false positive input include at least one stored set of sensor readings indicative of unintentional activation;
   monitoring sensor information at the handheld gaming controller, the sensor information obtained from one or more sensors associated with the handheld gaming controller;
   detecting the monitored sensor information matches one or more of the indicia of false positive input, wherein the monitored sensor information includes a monitored set of sensor readings that match the at least one stored set of sensor readings indicative of unintentional activation;
   nullifying input received from one or more input components of the handheld gaming controller based on detecting that the monitored sensor information matches one or more of the indicia of false positive input, wherein the nullified input does not result in control changes to associated media;
   maintaining a nullification period as long as the monitored sensor information continues to match the indicia of false positive input, wherein any subsequent input received from the handheld gaming controller during the nullification period is nullified;
   detecting when the monitored sensor information no longer matches one or more of the indicia of false positive input; and
   ending the nullification period upon detection that the monitored sensor information no longer matches the indicia of false positive input, wherein further subsequent input received from the input components after the end of the nullification period results in control changes to the associated media.

2. The method of claim 1, wherein the sensor information includes data from an accelerometer.

3. The method of claim 1, wherein the sensor information includes data from a gyroscope.

4. The method of claim 1, wherein the sensor information includes data from a touch sensor.

5. The method of claim 1, wherein the indicia of false positive input includes indicia of a freefall.

6. The method of claim 5, wherein the indicia of freefall includes a set of accelerometer or gyroscope values.

7. The method of claim 5, wherein the indicia of freefall includes a time value indicative that a distance of the freefall is longer than an average human arm.

8. The method of claim 1, wherein the stored indicia of false positive input associated with the handheld gaming controller is customizable with respect to a user associated with the handheld gaming controller.

9. The method of claim 1, wherein the stored indicia of false positive input associated with the handheld gaming controller is different for each associated media.

10. The method of claim 1, wherein the stored indicia of false positive input associated with the handheld gaming controller is different for each handheld gaming controller.

11. A system for detecting and preventing false positives in a handheld gaming controller, the system comprising:
    a media system comprising memory that stores information regarding indicia of false positive input associated with the handheld gaming controller used to control media usage, wherein the indicia of false positive input include at least one stored set of sensor readings indicative of unintentional activation; and
    the handheld gaming controller comprising:
        one or more input components that receives input from a user regarding control of media usage,
        one or more sensors that monitor sensor information, and
        a communication interface that communicates the monitored input and sensor information; and
    a processor that executes instructions stored in memory, wherein execution of the instructions by the processor:
        detects that the monitored sensor information matches the one or more indicia of false positive input, wherein the monitored sensor information includes a monitored set of sensor readings that match the at least one stored set of sensor readings indicative of unintentional activation,
        nullifies input received from one or more input components of the handheld gaming controller based on detecting that the monitored sensor information matches one or more of the indicia of false positive input, wherein the nullified input does not result in control changes to associated media,
        maintains a nullification period as long as the monitored sensor information continues to match the indicia of false positive input, wherein any subsequent input received from the handheld gaming controller during the nullification period is nullified,
        detects when the monitored sensor information no longer matches one or more of the indicia of false positive input, and
        ends the nullification period upon detection that the monitored sensor information no longer matches the indicia of false positive input, wherein further subsequent input received from the input components after the end of the nullification period results in control changes to the associated media.

12. The system of claim 11, wherein the sensor information includes data from an accelerometer.

13. The system of claim 11, wherein the sensor information includes data from a gyroscope.

14. The system of claim 11, wherein the sensor information includes data from a touch sensor.

15. The system of claim 11, wherein the indicia of false positive input includes indicia of a freefall.

16. The system of claim 15, wherein the sensors comprise one or more accelerometers or gyroscopes and wherein the indicia of freefall includes a set of accelerometer or gyroscope values.

17. The system of claim 15, wherein the indicia of freefall includes a time value indicative that a distance of the freefall is longer than an average human arm.

18. A non-transitory computer-readable storage medium, having embodied thereon a program executable by a processor to perform a method for detecting and preventing false positives in a handheld gaming controller, the method comprising:
    storing information regarding indicia of false positive input associated with the handheld gaming controller used to control media usage wherein the indicia of false positive input include at least one stored set of sensor readings indicative of unintentional activation;
    monitoring sensor information at the handheld gaming controller, the sensor information obtained from sensors associated with the handheld gaming controller;
    detecting that the monitored sensor information matches one or more of the indicia of false positive input wherein the monitored sensor information includes a monitored set of sensor readings that match the at least one stored set of sensor readings indicative of unintentional activation;
    nullifying input received from one or more input components of the handheld gaming controller based on detecting that the monitored sensor information matches one or more of the indicia of false positive input, wherein the nullified input does not result in control changes to associated media;
    maintaining a nullification period as long as the monitored sensor information continues to match the indicia of false positive input, wherein any subsequent input received from the handheld gaming controller during the nullification period is nullified;
    detecting when the monitored sensor information no longer matches one or more of the indicia of false positive input; and
    ending the nullification period upon detection that the monitored sensor information no longer matches the indicia of false positive input, wherein subsequent further input received from the input components after the end of the nullification period results in control changes to the associated media.

19. The non-transitory computer-readable storage medium of claim 18, wherein the sensor information includes data from an accelerometer.

20. The non-transitory computer-readable storage medium of claim 18, wherein the sensor information includes data from a gyroscope.

21. The non-transitory computer-readable storage medium of claim 18, wherein the sensor information includes data from a touch sensor.

22. The non-transitory computer-readable storage medium of claim 18, wherein the indicia of false positive input includes indicia of a freefall.

23. The non-transitory computer-readable storage medium of claim 22, wherein the indicia of freefall includes a set of accelerometer or gyroscope values.

24. The non-transitory computer-readable storage medium of claim 22, wherein the indicia of freefall includes a time value indicative that a distance of the freefall is longer than an average human arm.

* * * * *